US009729673B2

(12) United States Patent
Holmes

(10) Patent No.: US 9,729,673 B2
(45) Date of Patent: Aug. 8, 2017

(54) METHOD AND SYSTEM FOR PROVIDING SYNCHRONIZED VIEWS OF MULTIPLE APPLICATIONS FOR DISPLAY ON A REMOTE COMPUTING DEVICE

(71) Applicant: Calgary Scientific Inc., Calgary (CA)

(72) Inventor: Colin J. Holmes, Vancouver, WA (US)

(73) Assignee: Calgary Scientific Inc., Calgary, AB (CA)

( * ) Notice: Subject to any disclaimer, the term of this patent is extended or adjusted under 35 U.S.C. 154(b) by 574 days.

(21) Appl. No.: 13/922,744

(22) Filed: Jun. 20, 2013

(65) Prior Publication Data

US 2013/0346482 A1 Dec. 26, 2013

Related U.S. Application Data

(60) Provisional application No. 61/662,561, filed on Jun. 21, 2012.

(51) Int. Cl.
*G06F 15/16* (2006.01)
*H04L 29/06* (2006.01)
(Continued)

(52) U.S. Cl.
CPC ............ *H04L 67/42* (2013.01); *G06F 9/4445* (2013.01); *H04L 67/1095* (2013.01);
(Continued)

(58) Field of Classification Search
CPC ..................................................... G06F 9/4445
(Continued)

(56) References Cited

U.S. PATENT DOCUMENTS 4,975,690 A 12/1990 Torres
5,345,550 A 9/1994 Bloomfield
(Continued)

FOREIGN PATENT DOCUMENTS

CN 101539932 9/2009
CN 101883097 11/2010
(Continued)

OTHER PUBLICATIONS

Extended European Search Report, dated Mar. 3, 2015, received in connection with corresponding European Application No. 09828497.9.

(Continued)

*Primary Examiner* — Imad Hussain
(74) *Attorney, Agent, or Firm* — Meunier Carlin and Curfman LLC

(57) ABSTRACT

A method and system of providing remote access at a client computer that executes a client remote access program that simultaneously communicates with first and second server remote access programs. The first and second server remote access programs determine first and second presentation data indicative of an application state of first and second application programs. The client remote access program receives the first and the second presentation data and determines display data in dependence thereupon for substantially simultaneously displaying the first and the second presentation data. The first and second application programs are provided with an out-of-band communication path to synchronize data between themselves, without the synchronization occurring through the client remote access program.

22 Claims, 6 Drawing Sheets

(51) Int. Cl.
*H04L 29/08* (2006.01)
*G06F 9/44* (2006.01)
*G06F 3/14* (2006.01)
*G09G 5/14* (2006.01)

(52) U.S. Cl.
CPC .............. *H04L 67/12* (2013.01); *H04L 67/38* (2013.01); *G06F 3/1454* (2013.01); *G09G 5/14* (2013.01)

(58) Field of Classification Search
USPC .......................................................... 709/203
See application file for complete search history.

(56) References Cited

U.S. PATENT DOCUMENTS 5,555,003 A 9/1996 Montgomery et al.
5,742,778 A 4/1998 Hao et al.
5,844,553 A * 12/1998 Hao .................... G06F 9/4443 709/201
5,870,759 A 2/1999 Bauer et al.
5,920,311 A * 7/1999 Anthias ................ G06F 3/1423 715/741
5,978,842 A 11/1999 Noble et al.
6,045,048 A 4/2000 Wilz et al.
6,061,689 A 5/2000 Chang et al.
6,075,531 A 6/2000 DeStefano
6,141,698 A 10/2000 Krishnan et al.
6,145,098 A 11/2000 Nouri et al.
6,253,228 B1 6/2001 Ferris et al.
6,343,313 B1 1/2002 Salesky et al.
6,453,334 B1 9/2002 Vinson et al.
6,453,356 B1 9/2002 Sheard et al.
6,570,563 B1 5/2003 Honda
6,601,233 B1 7/2003 Underwood
6,792,607 B1 9/2004 Burd et al.
6,918,113 B2 7/2005 Patel et al.
6,938,096 B1 8/2005 Greschler et al.
6,970,459 B1 11/2005 Meier
6,976,077 B1 12/2005 Lehew et al.
7,065,568 B2 6/2006 Bracewell et al.
7,069,227 B1 6/2006 Lintel, III et al.
7,073,059 B2 7/2006 Worely et al.
7,149,761 B2 12/2006 Cooke et al.
7,167,893 B1 1/2007 Malone et al.
7,174,504 B2 2/2007 Tsao
7,181,686 B1 2/2007 Bahrs
7,193,985 B1 3/2007 Lewis et al.
7,240,162 B2 7/2007 de Vries
7,246,063 B2 7/2007 James et al.
7,320,131 B1 1/2008 O'Toole, Jr.
7,343,310 B1 3/2008 Stender
7,350,151 B1 3/2008 Nakajima
7,418,711 B1 8/2008 Lee et al.
7,451,196 B1 11/2008 de Vries et al.
7,577,751 B2 8/2009 Vinson et al.
7,620,901 B2 11/2009 Carpenter et al.
7,647,370 B1 1/2010 Liu et al.
7,650,444 B2 1/2010 Dirstine et al.
7,656,799 B2 2/2010 Samuels et al.
7,706,399 B2 4/2010 Janczak
7,725,331 B2 5/2010 Schurenberg et al.
7,802,183 B1 9/2010 Essin
7,831,919 B1 11/2010 Viljoen et al.
7,921,078 B2 4/2011 McCuller
7,941,488 B2 5/2011 Goodman et al.
7,966,572 B2 6/2011 Matthews et al.
8,024,523 B2 9/2011 de Vries et al.
8,261,345 B2 9/2012 Hitomi et al.
8,356,252 B2 1/2013 Raman et al.
8,359,591 B2 1/2013 de Vries et al.
8,509,230 B2 8/2013 Vinson et al.
8,527,706 B2 9/2013 de Vries et al.
8,572,178 B1 10/2013 Frazzini et al.
8,606,952 B2 12/2013 Pasetto et al.
8,607,158 B2 12/2013 Molander et al.
8,627,081 B2 1/2014 Grimen et al.
8,667,054 B2 3/2014 Tahan
8,832,260 B2 9/2014 Raja et al.
8,924,512 B2 12/2014 Stoyanov et al.
2001/0047393 A1 11/2001 Arner et al.
2002/0032751 A1 3/2002 Bharadwaj
2002/0032804 A1 3/2002 Hunt
2002/0092029 A1 7/2002 Smith
2003/0014735 A1 1/2003 Achlioptas et al.
2003/0023670 A1 1/2003 Walrath
2003/0055893 A1 3/2003 Sato et al.
2003/0065738 A1 4/2003 Yang et al.
2003/0120324 A1 6/2003 Osborn et al.
2003/0120762 A1 6/2003 Yepishin et al.
2003/0149941 A1 8/2003 Tsao
2003/0163514 A1 8/2003 Waldschmidt
2003/0184584 A1 10/2003 Vachuska et al.
2003/0208472 A1 11/2003 Pham
2004/0015842 A1 1/2004 Nanivadekar et al.
2004/0029638 A1 2/2004 Hytcheson et al.
2004/0039742 A1 2/2004 Barsness et al.
2004/0068516 A1 4/2004 Lee et al.
2004/0106916 A1 6/2004 Quaid et al.
2004/0117804 A1 6/2004 Scahill et al.
2004/0153525 A1 8/2004 Borella
2004/0162876 A1 8/2004 Kohavi
2004/0183827 A1 9/2004 Putterman et al.
2004/0236633 A1 11/2004 Knauerhase et al.
2004/0243919 A1 12/2004 Muresan et al.
2004/0249885 A1 12/2004 Petropoulakis et al.
2005/0005024 A1 1/2005 Samuels et al.
2005/0010871 A1 1/2005 Ruthfield et al.
2005/0021687 A1 1/2005 Anastassopoulos et al.
2005/0050229 A1 3/2005 Comeau et al.
2005/0138631 A1 6/2005 Bellotti et al.
2005/0188046 A1 8/2005 Hickman et al.
2005/0188313 A1 8/2005 Matthews et al.
2005/0198578 A1 9/2005 Agrawala et al.
2005/0240906 A1 10/2005 Kinderknecht et al.
2006/0004874 A1 1/2006 Hutcheson et al.
2006/0026006 A1 2/2006 Hindle
2006/0031377 A1* 2/2006 Ng .................. G06F 17/30899 709/208
2006/0036770 A1 2/2006 Hosn et al.
2006/0085835 A1 4/2006 Istvan et al.
2006/0101397 A1 5/2006 Mercer et al.
2006/0130069 A1 6/2006 Srinivasan et al.
2006/0231175 A1 10/2006 Vondracek et al.
2006/0236328 A1 10/2006 DeWitt
2006/0258462 A1 11/2006 Cheng et al.
2006/0265689 A1 11/2006 Kuznetsov et al.
2006/0271563 A1 11/2006 Angelo et al.
2006/0288171 A1 12/2006 Tsien
2006/0294418 A1 12/2006 Fuchs
2007/0024645 A1 2/2007 Purcell et al.
2007/0047535 A1 3/2007 Varma
2007/0067754 A1 3/2007 Chen et al.
2007/0079244 A1* 4/2007 Brugiolo .............. G06F 9/4445 715/740
2007/0112880 A1 5/2007 Yang et al.
2007/0120763 A1 5/2007 De Paepe et al.
2007/0130292 A1 6/2007 Tzruya et al.
2007/0136677 A1 6/2007 Agarwal
2007/0203944 A1* 8/2007 Batra ............... G06F 17/30575
2007/0208718 A1 9/2007 Javid et al.
2007/0226636 A1 9/2007 Carpenter et al.
2007/0244990 A1 10/2007 Wells
2007/0256073 A1* 11/2007 Troung ................ G06F 21/606 718/1
2007/0282951 A1 12/2007 Selimis et al.
2008/0016155 A1 1/2008 Khalatian
2008/0134211 A1 6/2008 Cui
2008/0146194 A1 6/2008 Yang et al.
2008/0183190 A1 7/2008 Adcox et al.
2008/0313282 A1 12/2008 Warila et al.
2009/0044171 A1 2/2009 Avadhanula
2009/0080523 A1 3/2009 McDowell
2009/0089742 A1 4/2009 Nagulu et al.

(56) References Cited

U.S. PATENT DOCUMENTS

2009/0119644 A1 5/2009 de Vries et al.
2009/0209239 A1 8/2009 Montesdeoca
2009/0217177 A1* 8/2009 DeGrazia .............. G06F 3/0481 715/753
2010/0061238 A1 3/2010 Godbole et al.
2010/0077058 A1 3/2010 Messer
2010/0131591 A1 5/2010 Thomas et al.
2010/0150031 A1 6/2010 Allen et al.
2010/0174773 A1 7/2010 Penner et al.
2010/0205147 A1 8/2010 Lee
2010/0223566 A1* 9/2010 Holmes ................. G06F 3/0481 715/764
2010/0268813 A1 10/2010 Pahlavan et al.
2011/0138283 A1* 6/2011 Marston .............. G06F 17/2229 715/724
2011/0157196 A1 6/2011 Nave et al.
2011/0162062 A1 6/2011 Kumar et al.
2011/0184993 A1* 7/2011 Chawla ............... G06F 9/45533 707/802
2011/0213830 A1 9/2011 Lopez et al.
2011/0222442 A1 9/2011 Cole et al.
2011/0252152 A1 10/2011 Sherry et al.
2012/0030275 A1 2/2012 Boller et al.
2012/0084713 A1* 4/2012 Desai .................... G06F 3/0481 715/788
2012/0090004 A1 4/2012 Jeong
2012/0133675 A1 5/2012 McDowell
2012/0154633 A1 6/2012 Rodriguez
2012/0221792 A1 8/2012 de Vries et al.
2012/0226742 A1* 9/2012 Momchilov .......... G06F 3/0481 709/203
2012/0245918 A1 9/2012 Overton et al.
2012/0246225 A1 9/2012 Lemire et al.
2012/0271875 A1 10/2012 Cai
2012/0324032 A1 12/2012 Chan
2012/0324358 A1 12/2012 Jooste
2013/0007227 A1 1/2013 Hitomi et al.
2013/0031618 A1* 1/2013 Momchilov .............. G06F 3/14 726/7
2013/0046815 A1 2/2013 Thomas et al.
2013/0046816 A1 2/2013 Thomas et al.
2013/0054679 A1* 2/2013 Jooste ....................... G06F 9/54 709/203
2013/0070740 A1 3/2013 Yovin
2013/0117474 A1 5/2013 Ajanovic et al.
2013/0138791 A1 5/2013 Thomas et al.
2013/0147845 A1 6/2013 Xie et al.
2013/0159062 A1* 6/2013 Stiehl ..................... G06Q 10/06 705/7.36
2013/0179962 A1 7/2013 Arai et al.
2013/0262566 A1 10/2013 Stephure et al.
2014/0240524 A1 8/2014 Julia et al.
2014/0241229 A1 8/2014 Bertorelle et al.
2014/0298420 A1 10/2014 Barton et al.
2015/0067769 A1 3/2015 Barton et al.
2015/0156133 A1 6/2015 Leitch et al.
2015/0319252 A1 11/2015 Momchilov et al.

FOREIGN PATENT DOCUMENTS

CN 102129632 7/2011
CN 102821413 12/2012
EP 0349463 1/1990
EP 1422901 5/2004
JP 2007/084744 3/1995
JP 2002/055870 2/2002
JP 2004-287758 10/2004
JP 2005/031807 2/2005
JP 2005/521946 7/2005
JP 2008-099055 4/2008
JP 2010-256972 11/2010
RU 2295752 3/2007
RU 2298287 4/2007
RU 2305860 9/2007
WO 98/58478 12/1998
WO 01/16724 3/2001
WO 02/09106 1/2002
WO 03/032569 4/2003
WO 03/083684 10/2003
WO 2010/060206 6/2010
WO 2010/088768 8/2010
WO 2010/127327 11/2010
WO 2012/127308 9/2012
WO 2013/024342 2/2013
WO 2013/024343 2/2013
WO 2013/109984 7/2013
WO 2013/128284 9/2013
WO 2013/153439 10/2013

OTHER PUBLICATIONS

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, 5th Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

International Search Report, dated Feb. 19, 2010, in connection with International Application No. PCT/CA2009/001704.

International Preliminary Report on Patentability and Written Opinion, dated May 31, 2011, in connection with International Application No. PCT/CA2009/001704.

International Search Report, dated May 12, 2010, in connection with International Application No. PCT/CA2010/000154.

International Preliminary Report on Patentability and Written Opinion, dated Aug. 9, 2011, in connection with International Application No. PCT/CA2010/000154.

International Search Report and Written Opinion, dated Jul. 31, 2012, in connection with International Application No. PCT/IB2012/000562.

International Search Report, dated Dec. 20, 2012, in connection with International Application No. PCT/IB2012/001589.

International Preliminary Report on Patentability and Written Opinion, dated Feb. 18, 2014, in connection with International Application No. PCT/IB2012/001589.

International Search Report, dated Dec. 28, 2012, in connection with International Application No. PCT/IB2012/001590.

International Preliminary Report on Patentability and Written Opinion, dated Feb. 18, 2014, in connection with International Application No. PCT/IB2012/001590.

International Search Report and Written Opinion, dated Aug. 21, 2013, in connection with International Application No. PCT/IB2013/000676.

International Search Report and Written Opinion, dated Jul. 31, 2013, in connection with International Application No. PCT/IB2013/000720.

Extended European Search Report, dated Jun. 2, 2014, received in connection with European Application No. 12760310.8.

(56) References Cited

OTHER PUBLICATIONS

International Search Report and Written Opinion, dated Mar. 19, 2015, received in connection with International Application No. PCT/US2014/064243.

Search Report and Written Opinion, dated Nov. 16, 2015, received in connection with SG Application No. 2013087150.

International Preliminary Report on Patentability and Written Opinion, dated May 31, 2016, received in connection International Patent Application No. PCT/US2014/064243.

International Search Report and Written Opinion, dated Jun. 30, 2016, received in connection International Patent Application No. PCT/IB2016/000277.

Search Report, dated Dec. 30, 2016, received in connection with CN Application No. 2012800398130. (and English Translation).

* cited by examiner

METHOD AND SYSTEM FOR PROVIDING SYNCHRONIZED VIEWS OF MULTIPLE APPLICATIONS FOR DISPLAY ON A REMOTE COMPUTING DEVICE

CROSS-REFERENCE TO RELATED APPLICATION

The present disclosure claims priority to U.S. Provisional Patent Application No. 61/662,561, filed Jun. 21, 2012, entitled "Method and System for Providing Synchronized Views of Multiple Applications for Display on a Remote Computing Device," the disclosure of which is incorporated by reference in its entirety.

BACKGROUND OF THE DISCLOSURE

In numerous present day scenarios, computer networks may provide remote access to data for display on a computing device, and in particular to remote synchronized views of multiple datasets provided by applications on different server instances. For example, in the healthcare sector a medical practitioner, such as a surgeon working at a first hospital, may want to compare medical imaging data, such as, for example, MRI data or CT Scan data of a patient captured at the first hospital with imaging data of the patient that have been previously captured at a second hospital or medical imaging facility. In another example, a medical practitioner may want to compare imaging data captured of a patient with reference imaging data stored in a medical repository.

Use of wireless handheld devices such as, for example, IPHONE, ANDROID, and IPAD has rapidly increased over the last couple of years to the extent that now nearly every professional owns at least one wireless handheld device. State of the art wireless mobile technology enables use of small wireless handheld devices to access the Internet and download various forms of image data files for display thereon.

In a traditional multiple-server/single-client remote access model, synchronization of the views between multiple remotely accessed application programs involves bidirectional client-server communications and multiple synchronization steps. In particular, each synchronization step requires a round trip through the client, thus placing constraints on the uplink communication bandwidth available at the wireless client device and requiring additional time for the round trip to complete.

SUMMARY OF THE DISCLOSURE

A method and system for providing remote access to data for display on a computing device such as a mobile device via a computer network is provided. According to some implementations, the method and system provide substantially simultaneous remote access to data stored in different locations for synchronized display on a wireless handheld device via a wireless computer network. An out-of-band communication mechanism is provided to enable application programs associated with the data to communicate with each other without the need to communicate via a round trip through the client.

In accordance with the present disclosure, there is disclosed a method of providing remote access to a plurality of application programs executing on plural server computers. The method may include providing at least one server remote access program on each the plural server computers, each of the plural server remote access programs being in communication with a respective one of plural application programs; providing at least one remote connection to a client remote access program executing on a client computer, the client remote access program communicating with the at least one server remote access program over the at least one remote connection to enable access to the plural application programs; providing a communication connection between the plural server computers to synchronize the state among the plural server computers; communicating presentation data representing a change in a state of at least one of the plural application programs to the client remote access program; and displaying the presentation data at the client computer.

In accordance with aspects of the present disclosure, there is disclosed an apparatus for providing remote access to a plurality of application programs executing on plural server computers. The apparatus may include a first server having a first memory and a first processor, the first server executing a first server remote access program on the first processor that is in communication with a first application program; and a second server having a second memory and a second processor, the second server executing a second server remote access program on the second processor that is in communication with a second application program. A communication connection may be provided between the first server and the second server to synchronize a state between the first server and the second server, wherein presentation data representing a change in the state of at least one of the first application program and the second application program is communicated to a client remote access program associated with a client computer in remote communication with the first server remote access program and the second sever remote access program, and wherein the client computer displays the presentation data on a display associated with at the client computer.

In accordance with aspects of the present disclosure, there is disclosed a method of providing remote access to a plurality of application programs executing on plural server computers. The method may include providing a server remote access program on each of the plural server computers, each server remote access program being in communication with a respective one of plural application programs; synchronizing, among the plural server computers, presentation data associated with each the plurality of application programs; communicating the presentation data associated with the plurality of application programs to a client remote access program executing on a client computing device; determining display data to be displayed at the computing device in accordance with the presentation data; and simultaneously displaying the presentation data to display a view of the plural application programs.

These and other objects and advantages may be provided by the embodiments of the disclosure, including some implementations exemplified in the description and figures.

BRIEF DESCRIPTION OF THE DRAWINGS

The accompanying drawings, which are incorporated in and constitute a part of this disclosure, illustrate various implementations. Like reference numerals are used to reference like elements throughout. In the drawings.

DETAILED DESCRIPTION OF THE DISCLOSURE

Unless defined otherwise, all technical and scientific terms used herein have the same meaning as commonly understood by one of ordinary skill in the art. While implementations of the disclosure will be described for providing substantially simultaneous remote access to imaging data stored in two different locations in a clinical environment for display on a wireless handheld device only for the sake of simplicity, it will become evident to those skilled in the art that the implementations of the disclosure are not limited thereto, but are applicable for providing remotes access to any number of locations, various other forms of data, in numerous other present day applications, and for display on other devices such as laptop computers or personal computers.

Figure 1:
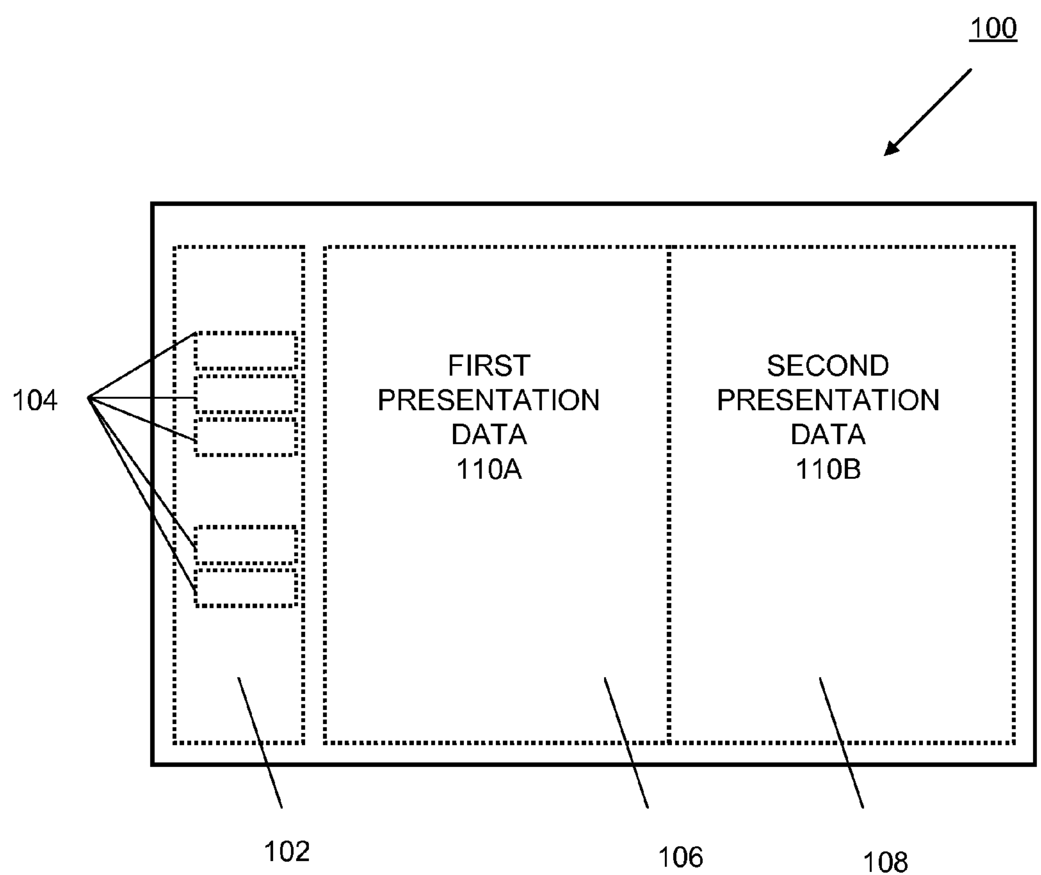
FIG. 1 illustrates an example of a display for displaying a first and the second presentation data in a single user interface.

FIG. 1 illustrates an example single user interface 100 for displaying first and second presentation data 110A, 110B associated with a first and second server, respectively. The single user interface 100 may be displayed by a client computer and comprises two image display fields 106 and 108 for simultaneously displaying the first and the second presentation data 110A, 110B, for example, in a side by side fashion. As will be described in more detail with regard to FIGS. 2 and 3, the multiple-server/single-client remote access model may be used in scenarios where a client device interfaces with two or more applications provided by two or more remote servers. The servers may each communicate presentation data to the client that is displayed, for example, in the single user interface 100.

Interaction zones 104 may be displayed in an interaction field 102 placed, for example, to the left hand side of the image display field 106. Other display options include placing: the image display fields 106 and 108 on top of each other; the interaction field in different locations on the screen; the interaction zones in a plurality of different locations on the screen. Optionally, the user of the client computer may be enabled to place the various fields and/or interaction zones using, for example, drag and drop technology.

Figure 2:
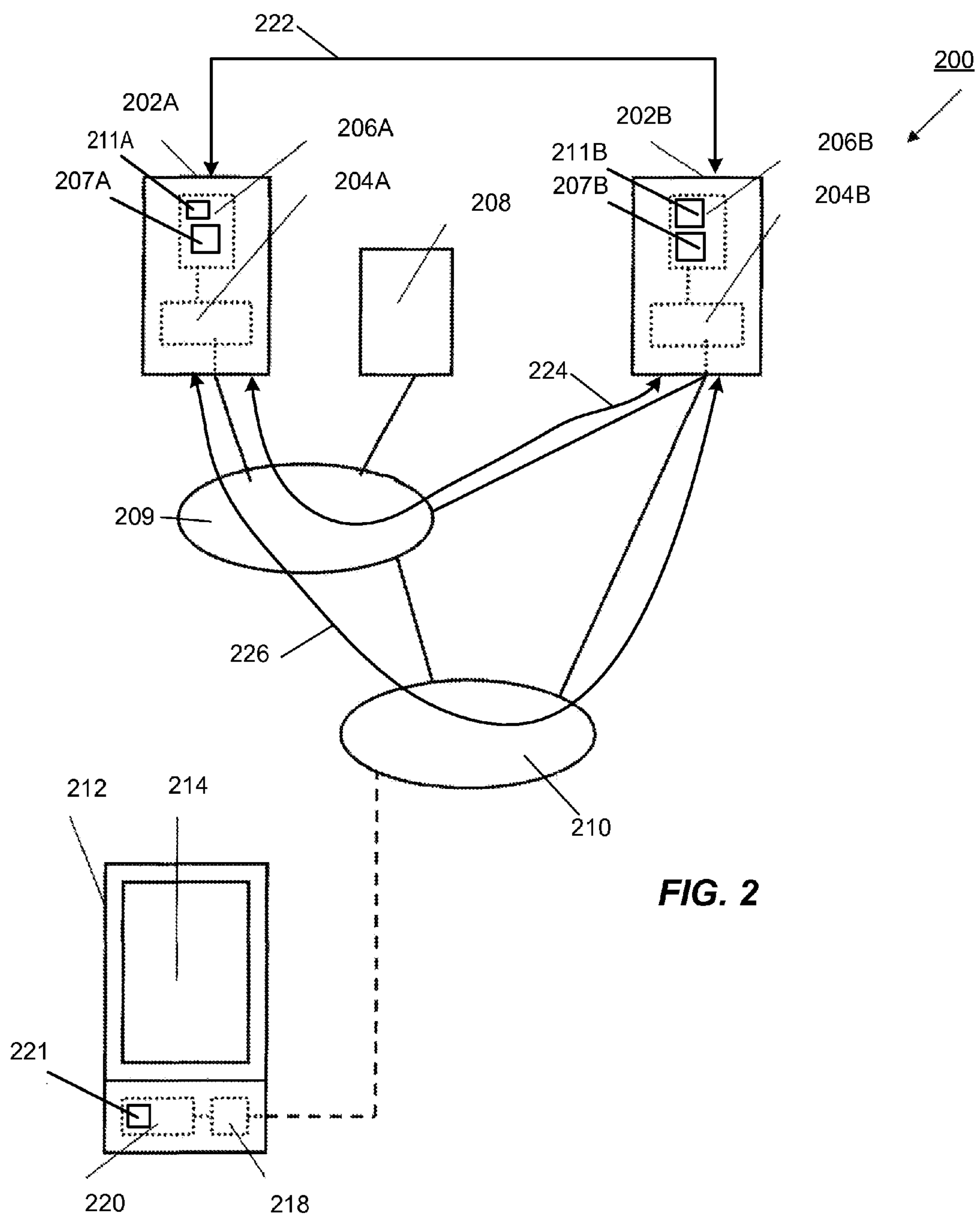
FIG. 2 is a simplified block diagram of a system for providing remote access to data for display on a mobile device via a computer network.
Figure 3:
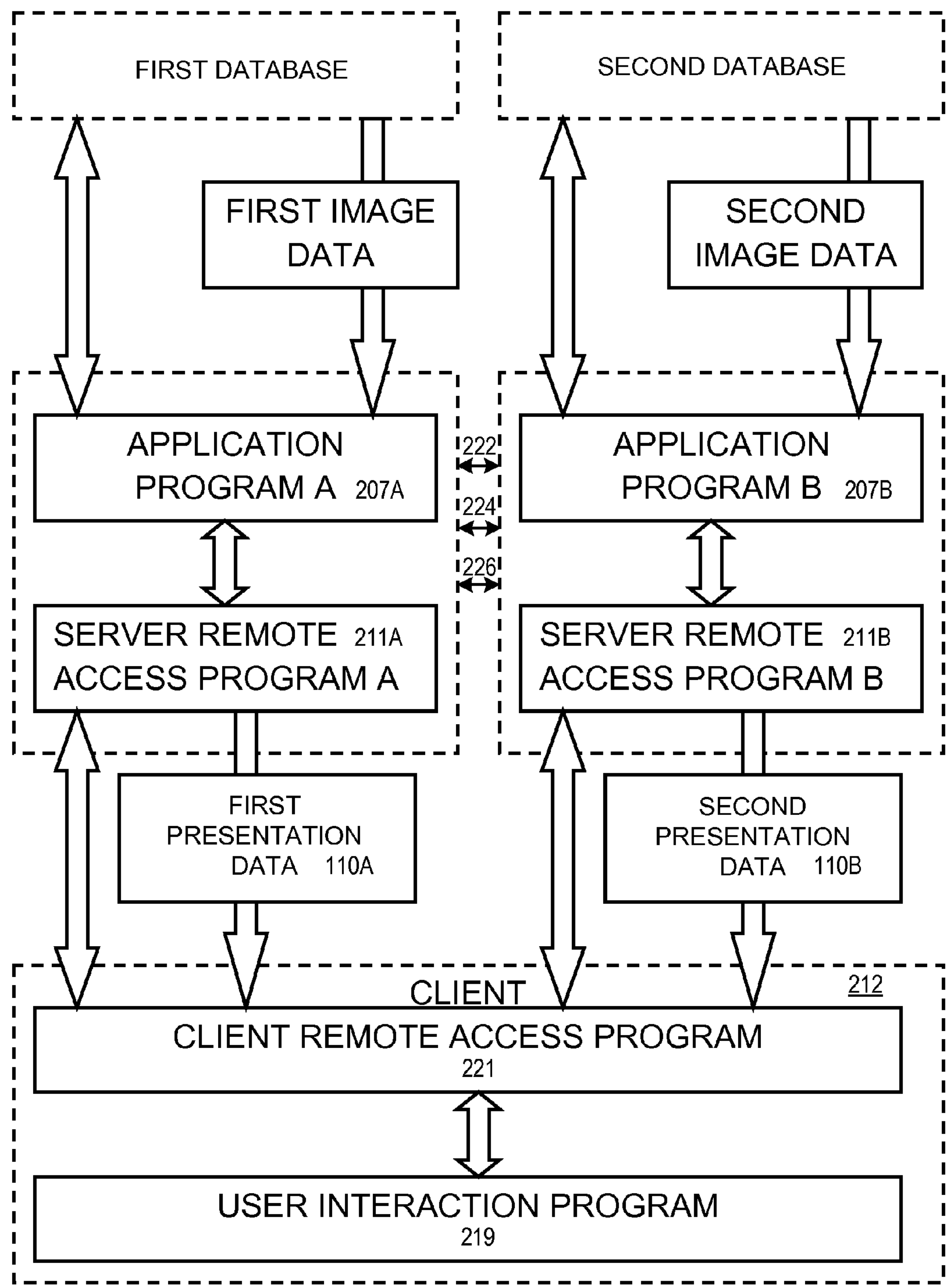
FIG. 3 is a simplified block diagram illustrating communication of a client computer with a first server computer and a second server computer of the system shown in FIG. 2.

Thus, with reference to FIGS. 2 and 3, there is illustrated a system 200 for providing remote access to data for display on a mobile device via a computer network according to the present disclosure wherein synchronization of presentation data 110A, 110B between server computers is performed using an out-of-band communication path. The system 200 comprises a client computer 212, such as wireless handheld device such as, for example, an IPHONE 212 (or other any other mobile device) connected via a communication network 210 such as, for example, the Internet, to a first server computer 202A and a second server computer 202B. Other client computers may be connected to the communication network 210, such as desktop computers, laptop/notebook computers, thin client devices, tablet computers, virtual computers, etc., that are either wired or wirelessly connected to the communication network 210. It is noted that the connections to the communication network 210 may be any type of connection, for example, Wi-Fi (IEEE 802.11x), WiMax (IEEE 802.16), Ethernet, 3G, 4G, etc. The server computers 202A, 202B and the client computer 212 may be implemented using hardware such as that shown in the general purpose computing device of FIG. 6.

The first server computer 202A may be connected to a Local Area Network (LAN) 209 at, e.g., a first hospital while the second server computer 202B may be connected to the LAN 209 or a second LAN (not shown) of, e.g., a second hospital. Imaging data such as, for example, MRI imaging data, CT Scan imaging data and X-ray imaging data captured at the first hospital may be stored in a database 208 connected to the LAN 209. Although not shown for purposes of clarity, information may be stored in a database connected to the LAN 209 or a separate LAN of the second hospital. The LANs may be omitted and the first and the second server computer 202A, 202B may be directly connected to the computer network 210 with the databases being directly connected to the respective first and second server computers 202A, 202B.

As will be discussed in detail below, communication paths 222, 224 and 226 may be provided between the first and second server computer 202A and 202B to synchronize presentation data 110A and 110B. The paths may be used by applications executing on the server computers 202A and 202B to present synchronized views when their only link is the common client application (e.g., the client application presenting user interface 100). As illustrated in FIG. 1, in the image display fields 106 and 108, the client may be displaying entire views from each application (e.g. comparison viewing of medical imagery) or only small components thereof (e.g. text fields from disparate database viewers united using recombination).

The server computers 202A and 202B may execute an electronic Picture Archiving and Communication System (PACS) using the Digital Imaging and Communications in Medicine (DICOM) format for storage and transfer. The PACS is illustrated as application programs 207A and 207B, respectively. As is evident to those skilled in the art, the DICOM format is substantially unsuitable for providing remote access thereto and for displaying the same on a wireless handheld device. The PACS or other image retrieval or image processing applications are performed, for example, by executing on the processors 204A and 204B executable commands of the respective application programs 207A and 207B stored in memory 206A and 206B of the server computers 202A and 202B. It is noted that the application programs 207A and 207B may be type of application program and are not limited to image retrieval or image processing application programs.

According to some implementations, access to data using, for example, the handheld wireless device 212 is enabled by executing: a first server remote access program 211A on the processor 204A of the first server computer 202A; a second server remote access program 211B on the processor 204B of the second server computer 202B; and a respective client remote access program 221 executed on a processor 218 of the client computer 212. The first and the second server remote access programs 211A and 211B may be performed by executing executable commands stored in the memory 206A and 206B of the first and the second server computer 202A and 202B while the client remote access program 221 is performed by executing executable commands stored in memory 220 of the client computer 212. An example of the server remote access program is PUREWEB, available from Calgary Scientific, Inc. of Calgary, Alberta, Canada. While first and the second server remote access programs 211A and 211B are illustrated as executing on the same server as their respective application programs 207A and 207B, the first and the second server remote access programs 211A and 211B and application programs 207A and 207B may execute on different servers.

Communications between the client computer 212 and the first and second server computer 202A and 202B is provided as communication between the first and the second server remote access program 211A and 211B and the client remote access program 221 via, for example, a wireless computer network. The first and the second server remote access program 211A and 211B communicate with a respective first and second application program such as, for example, a medical imaging program, such as RESOLUTIONMD, available from Calgary Scientific, Inc. of Calgary, Alberta, Canada. The first and the second application programs 207A and 207B communicate with the respective databases for retrieving respective first and second image data therefrom. The client remote access program 221 communicates with a user interaction program 219 (FIG. 3) such as, for example, a web browser or a native mobile application for displaying data such as, for example, image data and image processing control data; for receiving user input data for interacting with the first and the second application program using, for example, a graphical display with a touch-screen 214.

The first and the second server remote access programs and the client remote access program may be implemented using standard programming languages and communication is enabled using standard communication technologies such as, for example, Hyper Text Transfer Protocol (HTTP), virtual private networks (VPN), and secure socket layers (SSL), which are well known to those skilled in the art. Provision of the first and the second server remote access program and the client remote access program enable implementations of aspects of the disclosure as a retrofit to existing technologies on the server side as well as on the client side.

As shown in FIG. 3, the first and the second server remote access program 211A, 211B receive first and second image data from the first and the second application program 207A, 207B, respectively. Upon receipt, the first and the second server remote access program 211A, 211B generate first and second presentation data 110A, 110B, respectively, of the first and second image data and transmit the same to the client remote access program 221A, 221B. The presentation data 110A, 110B may be provided as part of a state model that describes an application state of the first and second application programs 207A and 207B. The first and second presentation data 110A, 110B may be generated in a fashion according to hardware capabilities of the client computer 212, for example, in accordance with processing capacity, memory size, type of graphical display, and type of user interface.

The presentation data 110A, 110B may be communicated in a document, such as an XML document that describes an association of logical elements of the application program 207A, 207B with corresponding states of the application program, with the logical elements being in a hierarchical order. For example, the logical elements may be a screen, a menu, a submenu, a button, etc. that make up the application program user interface. This enables the client device, for example, to natively display the logical elements. As such, a menu of the application program that is presented on a mobile phone will look like a native menu of the mobile phone. Similarly, the menu of the application program that is presented on desktop computer will look like a native menu of the desktop computer operating system.

For example, presentation data generated 110A, 110B and transmitted for a laptop computer or desktop computer are different from presentation data generated and transmitted for a handheld device such as, for example, an IPHONE. Generation of presentation data 110A, 110B enables a substantial reduction in the amount of data transmitted for display on the small display of a handheld wireless device, i.e., results in a reduction in bandwidth utilization. Furthermore, the generation of presentation data 110A, 110B addresses safety or privacy issues related to sensitive data such as medical imaging data by obviating the transmission of the sensitive data from the server computer to the client computer.

In some implementations, the client computing device 212, and/or the server computers 202A, 202B may collaboratively interact with the application programs 207A, 207B. As such, by communicating presentation data 110A, 110B between each of the participants in a collaborative session, each of the participating devices may present a synchronized view of the application programs 207A, 207B. In a collaborative session, users of different computing devices that may be in different places may each actively participate in the same session. The users in the collaborative session jointly operate the application programs 207A, 207B in real time over the LAN 209 or the communication network 210.

Thus, referring again to communications paths 222, 224 and 226 in FIG. 2, the paths may be provided between the first and second server computer 202A and 202B to synchronize presentation data 110A, 110B associated with application programs 207A, 207B running on the first and second server computers 202A, 202B. In conventional systems, when a particular client computer is displaying image data from multiple server computers in a many-to-one fashion in the single user interface 100, synchronization of the presentation data 110A, 110B involves bi-directional client-server communications and multiple synchronization steps. For example, information about presentation data is first passed to, and integrated for view, within a user interface 100 on the client computer. Then the presentation data is communicated back to the application programs 207A, 207B through the client remote access program 221 and the server remote access program 211A. The communication paths 222, 224 and 226 remove the need to share application state by passing the presentation data 110A, 110B through the client computer 212, eliminating the need for bi-directional communication.

In accordance with some implementations, interprocess communication (IPC) facilities may be used to enable the communication between and among the server computers 202A and 202B over communication paths 222, 224 and 226. IPC provides high-level support for connecting processes using TCP/IP sockets and for sending data between the processes. IPC facilities handle the opening sockets, registering messages, and sending and receiving messages, including both anonymous publish/subscribe and client/server type messages. IPC libraries contain functions to marshall (i.e., serialize) and unmarshall (i.e., de-serialize) data, and handle data transfer between machines, invoke user-defined handlers when a message is received, and invoke user-defined callbacks at set intervals. If the applications are on the same server computer, IPC may use, e.g., UNIX sockets or a shared memory space, rather than TCP/IP sockets. Examples of interprocess communications facilities include COM, ActiveX, etc.

As shown, the communications paths may be a direct path 222 between the server computers 202A and 202B; a local LAN path 224 that traverses the LAN 209; or a WAN path 226 that traverses the network 210. Also, if multiple application programs are executing on a single server computer, IPC can be implemented, as noted above. Thus, as shown in FIG. 2, the communication paths 222, 224 and 226 provide out-of-band communication paths between the application programs 207A and 207B that are being provided to a common remote user interface, e.g. 100, or between the server remote access programs 211A and 211B, which can enhance efficiency and speed of interaction while reducing networking delays.

Thus, the above enables the server computers 202A and 202B to communicate among themselves to accomplish the synchronization without requiring instruction from the user interaction program 219, thereby reducing the traffic on the client's uplink and improving performance overall as a result. Further, the communication paths 222, 224 and 226 are significantly faster connections, than the uplink from the client computer 212.

Figure 4:
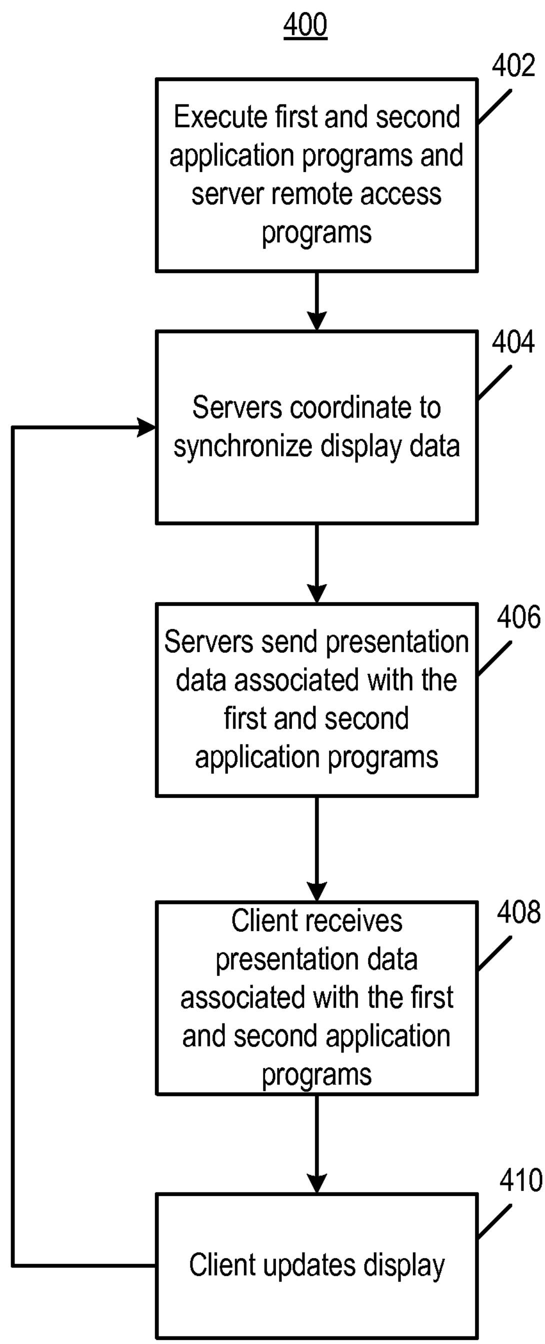
FIG. 4 illustrates an operational flow diagram of the processes that are performed in accordance with the present disclosure.

FIG. 4 illustrates an operational flow diagram of the processes 400 that are performed in accordance with the present disclosure. The processes 400 may be implemented to present image data from two different PACS in a coordinated viewer in e.g., a side-by-side fashion where the PACS directly send current slice coordinates to each other without requiring this information to be communicated through the client computer. At 402, the first and second application programs and first and second server remote access programs are executed. Using the processor 204A of the first server computer 202A, the first server remote access program 221A and the first application program 207A is executed. Likewise, using the processor 204B of the second server computer 202B, the second server remote access program 211B and the second application program 207B is executed.

At 404, the server computers may communicate to synchronize a display state. Using one or more of the communications paths 222, 224 and 226, the application programs 207A and 207B and/or the server remote access programs 211A and 211B may communicate using, e.g., IPC, to synchronize the presentation data. The server remote access programs 211A and 211B may exchange relevant portions of the presentation data 110A, 110B (e.g., XML data) to enable all views to be synchronized. For example, if the application program 107B is a PACS viewer, the information exchanged between server remote access programs 211A and 211B may be a viewpoint (e.g., virtual eye position), a specific image selected from a stack of images, or a patient anatomy normalized coordinates of a displayed slice. This information may be contained in the presentation data 110B. As another example, if the application programs 107A and 107B are each aerodynamic viewers, then the image display field 106 may be the airflow over a wing from above, the image display 108 may be the airflow mirrored from below. The server remote access programs 211A and 211B may synchronize the views using the display data 110A and 110B.

At 406, presentation data associated with the first and/or second application programs is communicated with the client remote access program. For example, the first presentation data 110A may be indicative of an application state of the first application program 207A and/or the second presentation data 110B may be indicative of an application state of the first application program 207B, where the states may be imagery associated with the application programs.

At 408, the client remote access program receives the first and/or the second presentation data and determines display data in dependence thereupon for substantially simultaneously displaying the first and the second presentation data. The display data may be indicative of the user interface 100. Using the graphical display 214 of the client computer 212 the display data is displayed in a human comprehensible fashion.

At 410, changes due to the synchronization may be presented in the user interface. For example, updated presentation data 110A and/or 110B may be provided to the client remote access program 221, which in turn may be used to update the user interface 100.

Figure 5:
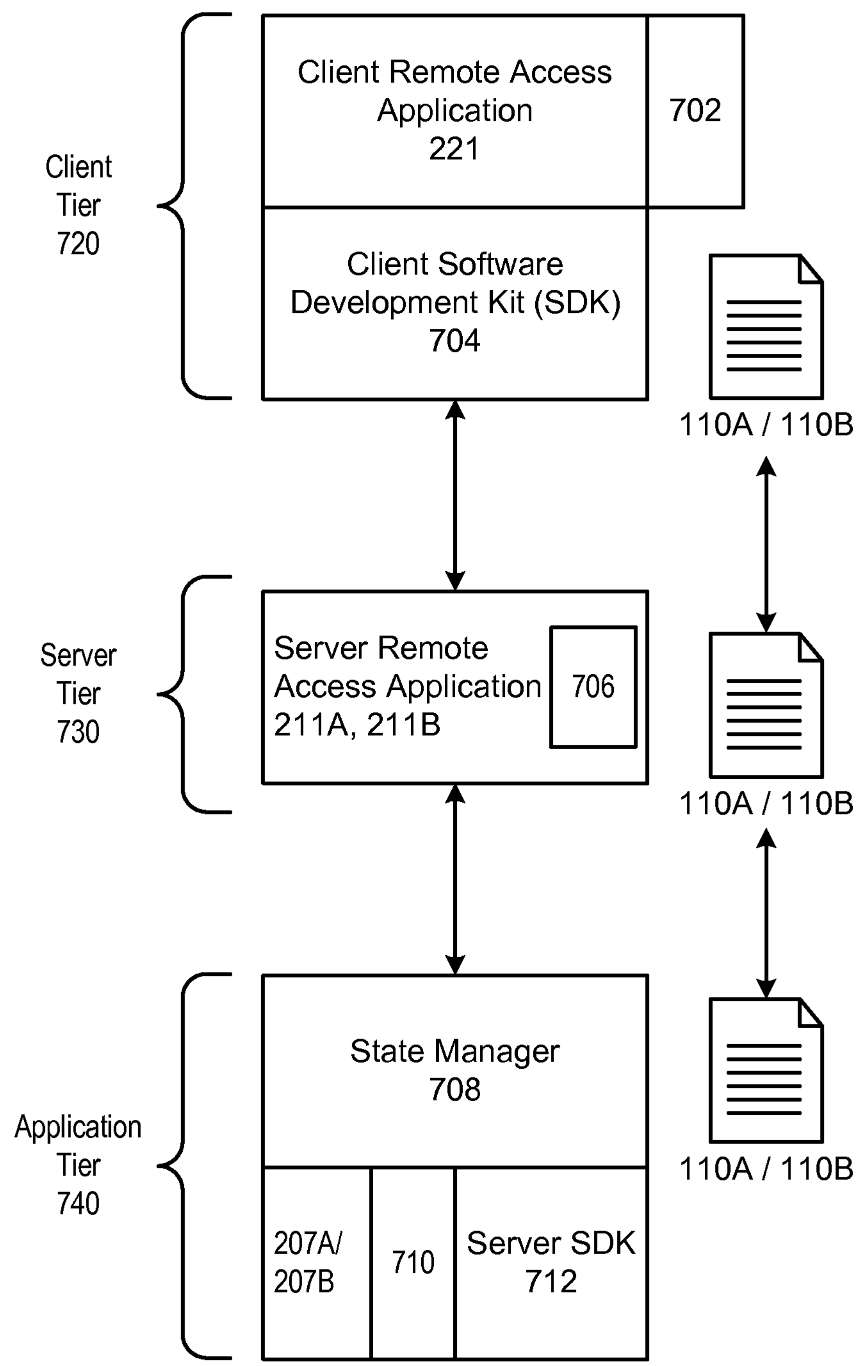
FIG. 5 illustrates additional aspects of the system of FIGS. 2 and 3.

FIG. 5 illustrates additional aspects of the system 200 of FIGS. 2 and 3. As illustrated, system 200 may be provided as having a tiered software stack. The client remote access application 221 may sit on top of a client software development kit (SDK) 704 in a client tier 720. The client tier 720 communicates to the server remote access application 211A, 211B in a server tier 730. The server tier 730 communicates to a state manager 708 sitting on top of the applications 207A/107B and a server SDK 712 in an application tier 740. Application extensions may be implemented in any of the tiers, i.e., within the server tier as a plug-in 706, the client tier as client application extension 702, the application tier as application extension 710, or combinations thereof.

When executed, the client remote access application 221A updates the presentation data 110A, 110B in accordance with user input data received from a user interface program. The client remote access application 221 may generate control data in accordance with the updated presentation data 110A, 110B, and provide the same to the server remote access application 211B running on the server 202B.

Upon receipt of application data from an application program 207A, 207B, the server remote access application 211A, 211B updates the presentation data 110A, 110B in accordance with the screen or application data, generates presentation data in accordance with the updated presentation data 110A, 110B, and provides the same to the client remote access application 221 on the client computing device 212. The application programs 207A and 207B and/or the server remote access applications 211A and 211B may communicate with each other using the communication links 222, 224 and/or 226, as described above to synchronize information between each other.

Figure 6:
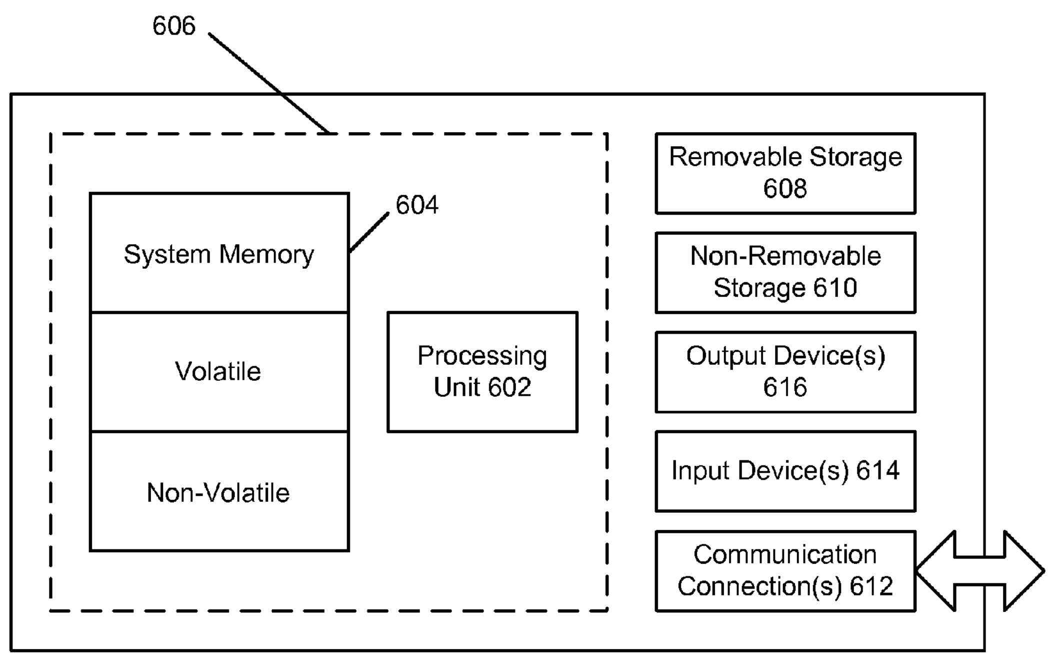
FIG. 6 shows an exemplary computing environment in which example aspects of the present disclosure may be implemented.

FIG. 6 shows an exemplary computing environment in which example aspects of the present disclosure may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for providing remote access to a plurality of application programs executing on plural server computers, comprising:

a first server having a first memory and a first processor, the first server executing a first server remote access program on the first processor that is in communication with a first application program; and a second server having a second memory and a second processor, the second server executing a second server remote access program on the second processor that is in communication with a second application program, wherein a communication connection is provided between the first server and the second server to synchronize a state between the first server and the second server, wherein presentation data representing a change in the state of at least one of the first application program and the second application program is communicated as a hierarchy of logical elements to a client remote access program associated with a client computer in remote communication with the first server remote access program and the second server remote access program, wherein the client remote access program determines display data configured to display a simultaneous view of the states of the first and second application programs in dependence upon the entirety of the presentation data presentation data and indicative of the user interface, wherein the client computer displays the display data on a display associated with the client computer until receiving updated presentation data and updating the display data.

2. The apparatus of claim 1, wherein the communication connection comprises at least one of a shared memory space, a socket, a direct path between the plural server computers, a local path that traverses a local area network between the plural server computers, and a wide area network path between the plural server computers.

3. The apparatus of claim 1, wherein communication connection utilizes interprocess communication (IPC) facilities.

4. The apparatus of claim 1, wherein a user interface associated with the first application program and the second application program is substantially simultaneously displayed in accordance with the presentation data.

5. The apparatus of claim 4, wherein interaction zones are defined on a display of the client computer, and wherein interactive functionalities of the first application program and the second application program are associated with a respective interaction zone.

6. The apparatus of claim 5, wherein plural client remote access programs execute on respective plural client computers, wherein presentation data representing a change in a state of at least one of the first application program and the second application program is provided to the plural client remote access programs, and wherein the presentation data is displayed at the plural client computers.

7. A method of providing remote access to a plurality of application programs executing on plural server computers, comprising:

providing a server remote access program on each of the plural server computers, each server remote access program being in communication with a respective one of plural application programs;

synchronizing respective states of a selection of the plural application programs among the plural server computers, using the respective server remote access programs to generate presentation data associated with the selection of the plurality of application programs and according to hardware capabilities of at least one client computing device receiving the presentation data;

after synchronizing the states and generating presentation data from the selection of the plurality of application programs, communicating the entirety of the presentation data to respective client remote access programs executing on the at least one client computing device;

determining, at the respective client remote access programs, display data indicative of a user interface, to be displayed at a respective client computing device in accordance with the presentation data until receiving updated presentation data and then updating the display data;

displaying the display data to display a simultaneous view of the states of the selection of plural application programs.

8. The method of claim 7, further comprising synchronizing the presentation data using an out-of-band communication link between the plural server computers.

9. The method of claim 8, wherein the out-of-band communication link utilizes interprocess communication (IPC) facilities.

10. The method of claim 7, further comprising:

defining interaction zones within the view displayed on a display of the client computer; and associating interactive functionalities of each of the plural application programs with a respective interaction zone.

11. A method of providing remote access to a plurality of application programs executing on plural server computers, comprising:

providing a server remote access program on each of the plural server computers, each server remote access program being in communication with a respective one of plural application programs;

synchronizing respective states of a selection of the plural application programs among the plural server computers, using the respective server remote access programs to generate presentation data associated with the selection of the plurality of application programs and according to hardware capabilities of at least one client computing device receiving the presentation data;

after synchronizing the states and generating presentation data from the selection of the plurality of application programs, communicating the entirety of the presentation data as a hierarchy of logical elements to a respective client remote access programs executing on the at least one client computing device;

determining, at the respective client remote access programs, display data indicative of a user interface, to be displayed at a respective client computing device in accordance with the presentation data until receiving updated presentation data and then updating the display data;

displaying the display data to display a simultaneous view of the states of the selection of plural application programs.

12. A method of providing remote access to a plurality of application programs executing on plural server computers, comprising:

providing at least one server remote access program on each of the plural server computers, each of the plural server remote access programs being in communication with a respective one of plural application programs;

providing a plurality of remote connections to respective client remote access programs executing on respective client computers and the client remote access programs communicating with the at least one server remote access program over the remote connections to enable access to the plural application programs;

providing a communication connection between the plural server computers;

synchronizing the states of the plural application programs among the plural server computers using an out-of-band communication link between the plural server computers that excludes the respective client computers;

communicating a first set of presentation data representing a change in a state of at least one of the plural application programs to a plurality of client remote access programs;

determining, at the respective client remote access programs, respective sets of display data, indicative of respective user interfaces at respective client computers wherein the display data at each of the respective client computers is in dependence upon the first set of presentation data;

displaying the respective display data at the respective client computers until receiving updated presentation data at the client remote access programs and updating the respective user interfaces.

13. The method of claim 12, wherein the communication connection comprises at least one of a shared memory space, a socket, a direct path between the plural server computers, a local path that traverses a local area network between the plural server computers, and a wide area network path between the plural server computers.

14. The method of claim 12, wherein the communication connection utilizes interprocess communication (IPC) facilities.

15. The method of claim 12, wherein the communication connection is provided between the plural server remote access programs.

16. The method of claim 12, further comprising substantially simultaneously displaying, in accordance with the presentation data, a user interface associated with each of the plural application programs.

17. The method of claim 12, further comprising:

defining interaction zones on a display of the client computer; and associating interactive functionalities of each of the plural application programs with a respective interaction zone.

18. The method of claim 17, wherein a same interactive functionality of the plural application programs are associated with a same interaction zone.

19. The method of claim 17, further comprising:

providing the at least one remote connection to plural client remote access programs executing on plural client computers;

communicating presentation data representing a change in a state of at least one of the plural application programs to the plural client remote access programs; and displaying the presentation data at the plural client computer.

20. The method of claim 19, further comprising:

associating the interaction zones with off-screen display buffers having characteristics that are independent of hardware capabilities of either of the plural server computers and the plural client computers; and sizing, by at least one of the plural server computers, the interaction zones to match each client computer in a round robin fashion as each client computer connected to the plural server computers is updated.

21. The method of claim 20, further comprising:

defining the interaction zones having one size for all of the plural client computers; and sending interaction zone scaling instructions to each client computer for display.

22. The method of claim 12, wherein the control data from the client remote access program comprises client screen data.

* * * * *